United States Patent [19]

Steckel

[11] Patent Number: 5,232,327
[45] Date of Patent: Aug. 3, 1993

[54] SHIP LOADER OR UNLOADER

[75] Inventor: Horst Steckel, St. Ingbert, Fed. Rep. of Germany

[73] Assignee: O&K Orenstein & Koppel AG, Berlin, Fed. Rep. of Germany

[21] Appl. No.: 659,333

[22] PCT Filed: Sep. 6, 1988

[86] PCT No.: PCT/EP88/00805

§ 371 Date: Mar. 6, 1991

§ 102(e) Date: Mar. 6, 1991

[87] PCT Pub. No.: WO90/02699

PCT Pub. Date: Mar. 22, 1990

[51] Int. Cl.$^5$ .............................................. B65G 67/60
[52] U.S. Cl. .............................. 414/141.4; 414/140.9; 414/141.3
[58] Field of Search ............... 414/140.8, 140.9, 141.8, 414/141.3, 141.4

[56] References Cited

U.S. PATENT DOCUMENTS 3,146,898  9/1964  Kersting ................... 414/141.8 X
3,198,353  8/1965  McDowell ................. 414/140.9

FOREIGN PATENT DOCUMENTS 618848   9/1935  Fed. Rep. of Germany.
1202221  4/1967  Fed. Rep. of Germany.
7407046  8/1975  Fed. Rep. of Germany.
3715056  9/1988  Fed. Rep. of Germany.
61-86317 5/1986  Japan ....................... 414/140.9

OTHER PUBLICATIONS

B. Kleis, "Schiffsbeladeanlage für Sackgut und loses Gut", *Fordern und Heben*, vol. 18, No. 13, 1968, pp. 803-804.

Primary Examiner—Michael S. Huppert
Assistant Examiner—Janice Krizek
Attorney, Agent, or Firm—Spencer, Frank & Schneider

[57] ABSTRACT

An arrangement for loading and unloading a ship comprises a boom having an upper portion in the form of a continuous box girder attached to a portal. An upper trackway is supported on a forward region of the boom on top of the box girder. A platform is suspended from a rear region of the boom and has a lower trackway mounted thereon. A movable feed head including an associated supply and discharge device and having one end adapted for cooperating with a loading and unloading device in the forward region of the boom is mounted for moving on the upper and lower trackways. A pylon is attached to a top side of the box girder between the ends of the boom, the upper trackway terminating approximately at the pylon. Guide cables are fixed to the boom and supported by the pylon. A drive is disposed on the box girder in the forward region of the boom for displacing the feed head, and struts are arranged for fixing the feed head to the drive.

10 Claims, 4 Drawing Sheets

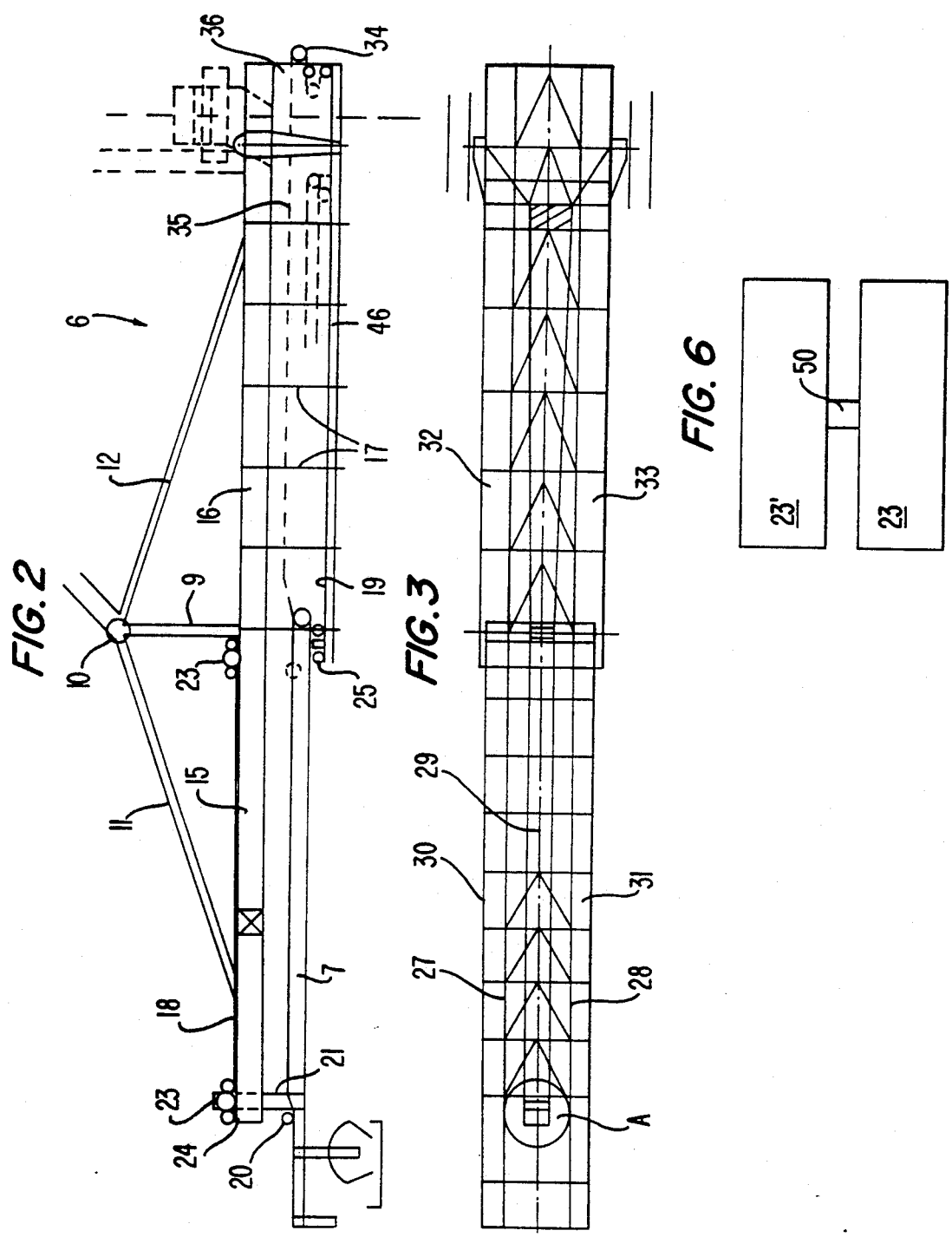

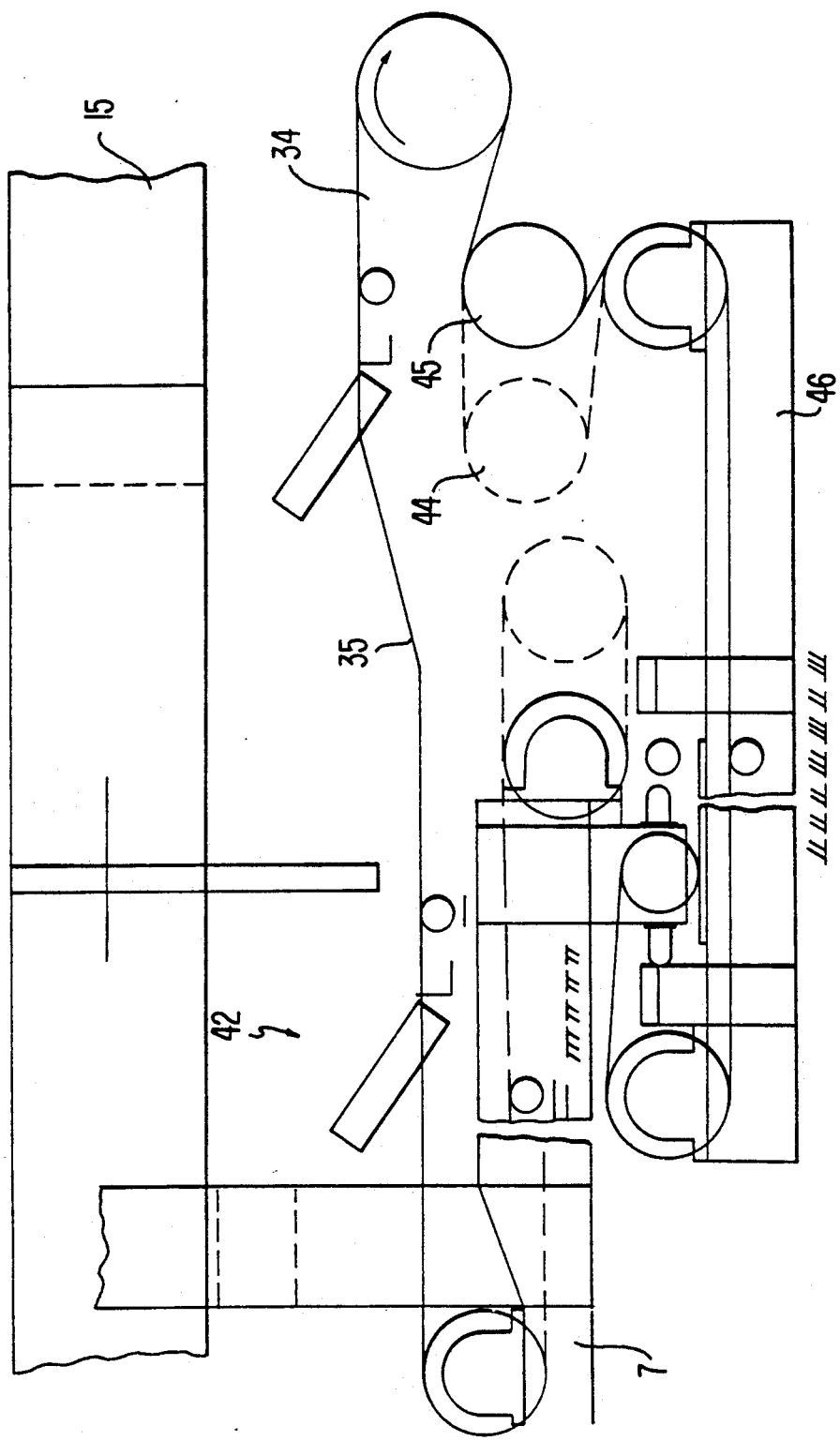

SHIP LOADER OR UNLOADER

BACKGROUND OF THE INVENTION

The invention relates to a ship loader or unloader including a boom supported in the region of a portal and a feed head which cooperates with a loading or unloading device disposed in the region of the forward end of the boom on the side of the ship, the feed head being movable on an upper and a lower track in the region of the boom and being equipped with an associated supply and discharging device. The upper track is provided in the region of the forward end of the boom and the lower track is provided in a platform-like region of the rear portal-like boom end.

German Patent 1,202,221 discloses a portal-like supporting device for a ship loader, with the device including a pivotal boom equipped with a discharge conveyor belt. The free end of the boom is suspended from a frame pylon so as to be raisable and lowerable. Between the frame halves there is disposed the boom which supports a discharge conveyor that can be pulled in and extended. One end of the boom is supported on a console in a bearing having a pivot axis oriented in the direction of travel, while its other, free end is suspended from cables which are brought over the tip of the pylons to lifting mechanisms in a machine house disposed at the pylons.

A drawback in addition to the heavy weight of the structure of the overall system is that enormous forces and moments occur in the region of the travel track of the discharge conveyor when the latter approaches its extended end position. Moreover, the components are almost inaccessible, particularly during operation, for monitoring and maintenance purposes so that the system must first be stopped to perform the necessary work.

A structurally similar device is disclosed in German Utility Model Patent No. 74/07,046. The boom arm is composed of a supporting frame which is movable in the longitudinal direction of a bridge that is ascendingly guided and is supported in a supporting portal so as to be rotatable on one side about a vertical axis and pivotal in height about a horizontal axis, with the supporting frame accommodating a transporting conveyor. In order to be able to move the supporting frame within the portal bridge, the latter is provided with truck rollers, with displacement being effected by means of a drive. Particularly with respect to the displacement of the supporting frame, the same arguments apply as described above. Moreover, a relatively complicated frame structure is required here in order to absorb and dissipate the forces.

Due to the structurally complicated and necessary measures in order to master the forces and moments generated during the extension of the feed head (supporting frame, discharge conveyor), the system must be made relatively heavy which ultimately results in increased costs.

For static reasons, ship loaders or unloaders employed in practice have been designed as follows:

For a feed head of, for example, a capacity up to 6000 t/h. welded carriers of a height of approximately 1.6 m have been provided with the most varied reinforcements. The boom itself is composed of welded carriers of a height of about 3.5 m and equipped with a plurality of buckling reinforcements. The belt contact disposed within the boom and the support and drive for the feed head were accessible only in a complicated manner so that necessary repair and maintenance work was possible only with large expenditures of time and money.

Such a system as described above is disclosed in the periodical "Fördern und Heben" [Conveying and Lifting], Volume 18 (1968), No. 13, pages 803 and 804, and corresponds to the species defined in the preamble of the first claim. The boom here has a box shape, with its walls being formed by a plurality of interconnected struts to which wind deflecting metal sheets are attached. Within the boom there is disposed a stationary belt equipped to transfer to a horizontally movable belt conveyor (feed head). In the region of the free boom end, there is disposed a charging head which can be raised and lowered by means of a winch provided on a carriage, with the carriage being movable within the box on separate guide rails in such a manner that the carriage is connected by way of connecting pipe with the movable conveyor and thus is displaced by the latter. The drawbacks of such a system have already been described above. Additionally, this system is of the stationary type and, when seen over the length of its boom, offers a large area of attack to the wind since the system cannot be pivoted upwardly relative to the actual device.

SUMMARY OF THE INVENTION

Based on the last-mentioned prior art, it is the object of the invention to provide an improved static system for the entire ship loader or unloader, with significant components being made structurally simpler. Additionally, the components cooperating with the ship loader or unloader are to be optimally accessible and, at the same time, the overall weight of the ship loader or unloader should be reduced considerably.

This is accomplished by the invention by a combination of the following features:
- the upper portion of the boom is configured as a continuous box girder;
- the box girder is provided with a pylon and with guying;
- the upper track is provided above the box girder and ends approximately in the region of the pylon;
- the drive for the feed head is disposed in the region of the forward end of the boom on the box girder;
- the feed head is fixed to the drive by way of struts.

Due to the inventive measures, the weight of the boom as well as of the feed head can be reduced by about 30%. The number of truck wheels as well as their bearings can be reduced considerably. Moreover, the costly tolerances between the truck rollers to enable the feed head to move in them are eliminated. Accessibility for maintenance or necessary repairs is provided over the entire length of the boom and in every position of the boom. Due to the drastic reduction in weight, the following positive side-effects occur:
- the portal becomes lighter in weight;
- the lifting mechanism becomes smaller;
- fewer drive mechanisms are required;
- transport and installation become more economical.

Due to the forward upward support of the feed head, the forces otherwise generated with a unilateral support are reduced drastically, with a considerable savings in costs resulting in addition to the already listed advantages. The forward portion of the boom is configured to accommodate chains and cables, and to support the drive shafts and toothed rods for the drive of the feed head, thus displacing these components into a region of unutilized areas and facilitating access.

BRIEF DESCRIPTION OF THE DRAWINGS

The invention is illustrated in an exemplary manner in the drawing figures and will now be described as follows. It is shown in:

FIGS. 2 & 3, various views of the boom of the ship loader of FIG. 1 in a horizontal position;

FIG. 5, detail views of the belt loop responsible for moving the feed head in and out;

FIG. 6 an enlarged view of section A in FIG. 3.

DETAILED DESCRIPTION OF THE PREFERRED EMBODIMENTS

Figure 1:
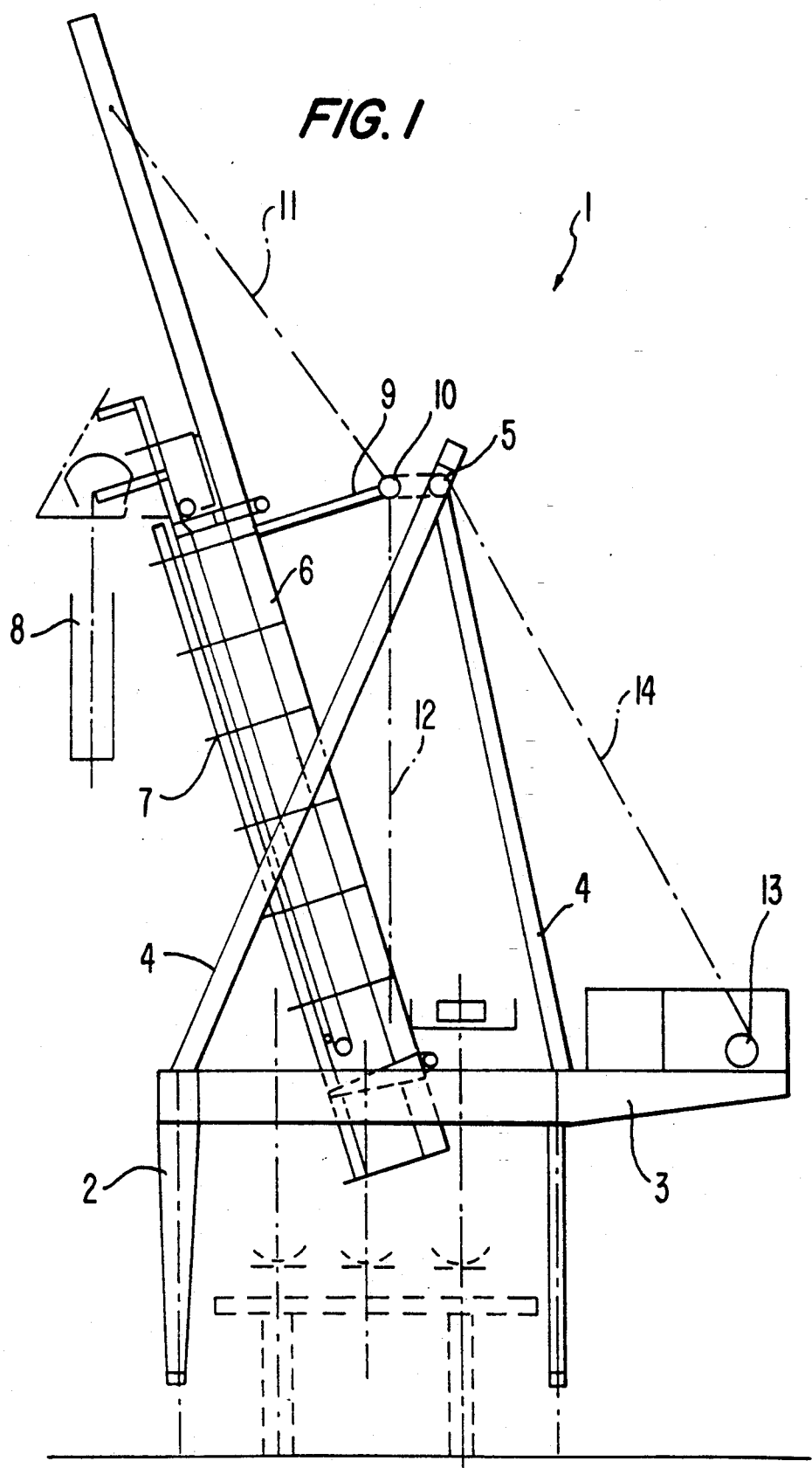
FIG. 1, a ship loader with the boom raised.

FIG. 1 shows a ship loader 1 essentially composed of the following components: a portal 2 movable on rails and equipped with a counterweight 3, guy wires 4 and pulley 5, a boom 6 equipped with a feed head 7 and a charging head 8 articulated to the feed head. Boom 6 is provided with a pylon 9 at whose tip another pulley 10 is disposed and serves as the pivot point for guying cables 11, 12. Boom 6 is raised and lowered by means of a winch 13 supported on portal 2 and by a cable 14 guided over pulleys 5 and 10. In the illustrated position, feed head 7 is retracted.

FIGS. 2 and 3 show exclusively the boom 6, in a side view (FIG. 2) and in a top view (FIG. 3). Boom 6 is composed of a continuous upper box girder 15 whose rear region 16 accommodates a platform 46 that is suspended by means of hangers 17. On the top side of box girder 15, tracks 18 are provided which extend approximately to pylon 9. Feed head 7 itself is movable, on the one hand, on a lower track 19 and, on the other hand, on the upper track 18. For this purpose, feed head 7 is suspended by means of struts 21 directly behind discharge drum 20 and is supported on tracks 18 by way of truck wheels 22 shown in FIG. 4. Referring briefly to FIG. 6, an enlarged view of drive 23 is shown parallel to drive 23' on common shaft 50. Drive 23 is here realized in that three chain wheels are provided about which a chain, which is not shown in detail, is reversed. At least one of the chain wheels is actuable by a motor (not shown). Drive 23 may additionally comprise two parallel drives arranged on a common shaft. The chain has its fixed points in the region of the tip 24 of the boom and in the region of pylon 9. In the region of the lower track 19, there are also provided truck rollers 25 which cooperate with feed head 7. In conjunction with the guying 9, 11, 12, the boom 6 shown here has a statically balanced and primarily light-weight design. The lower track 19 is formed by the longitudinal platform carriers 26 shown in FIG. 4. Feed head 7 itself is composed of rolled profiles, such as double-T supports 27, 28 with a wind brace 29 disposed therebetween for reinforcement. Walkways 30, 31 extend on both sides of and parallel to feed head 7. Analogously, further walkways 32, 33 are provided in the region of platform 46. The belt drive 34 for belt 35 is configured as a loop and is disposed in the rear portion 36 of boom 6.

Figure 4:
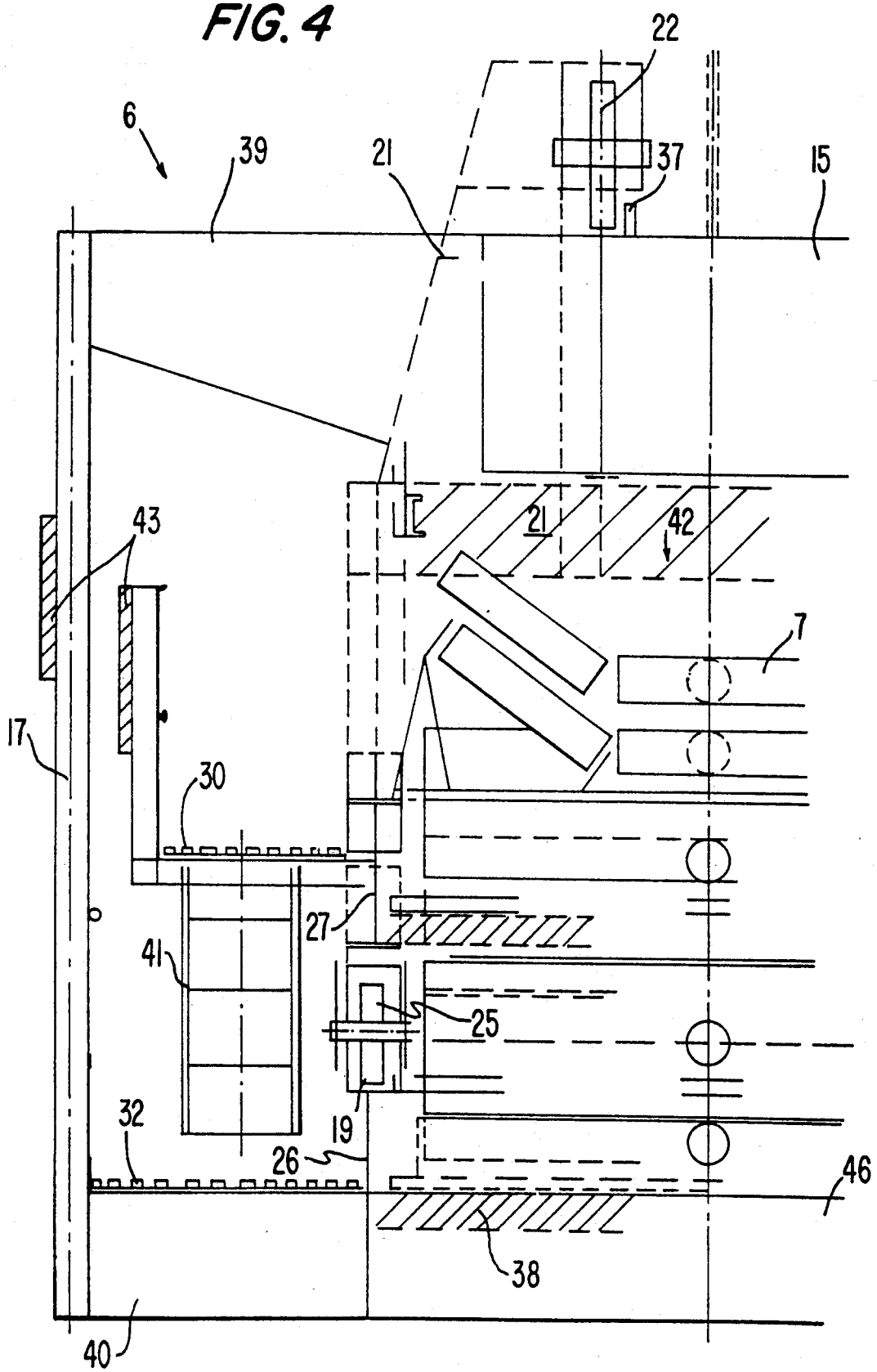
FIG. 4, a cross-sectional view of the boom.

FIG. 4 is a cross-sectional view of boom 6. Shown are the box girder 15 and track 18 as well as truck wheel 22. Also indicated is a chain drive 37. Truck wheel 22 is connected with feed head 7 by way of struts 21. Also shown is the lower track 19 and truck wheel 25 as well as the associated longitudinal platform carrier 26.

Below feed head 7, a platform 46 is visible which, like feed head 7, is also provided with a reinforcing wind brace 38. On the sides of boom 6, consoles 39 are provided at the top and transverse beams 40 are provided at the bottom so as to support the walkway 32 of the platform. Walkway 30 which is connected with the feed head can be reached by way of a ladder 41. All components of belt system 42 can be reached without problems so that the necessary repair and maintenance work can be performed quickly. The monitoring person has a complete overview of all movable components during operation so that any possibly necessary repairs can be planned accurately.

A windbreak 43 is provided in the outer walkway region to prevent material from being blown off the conveyor belt.

FIG. 5 is a detail view of the drive 34 for conveyor belt 35 which is configured as a belt loop equipped with tensioning drums 44, 45. Also visible is box girder 15, feed head 7 as well as the support for the latter in the region of platform 46.

I claim:

1. An arrangement for loading and unloading a ship, comprising:
    a portal;
    a boom comprising a continuous box girder, said box girder having one end connected to said portal, an opposite free end, a rear region adjacent said one end, a forward region adjacent said free end, and a top side;
    a pylon attached to the top side of said box girder intermediate said forward region and said rear region;
    an upper trackway mounted on said top side in said forward region;
    a platform suspended from said box girder in said rear region;
    a lower trackway mounted on said platform;
    a movable feed head cooperating with a supply and discharge means and adapted for cooperating with a loading and unloading device, said feed head being movable on said upper and lower trackways;
    guy cables fixed to said box girder and supported by said pylon;
    a drive for displacing said feed head along said upper and lower trackways, said drive being disposed on the top side of said box girder in said forward region; and
    a strut fixed to said feed head, said strut including means for engaging said upper trackway, said strut being connected to said drive.

2. An arrangement according to claim 1, wherein said drive includes a drive belt having a reversal point, said strut being suspended from said box girder immediately adjacent said belt reversal point.

3. An arrangement according to claim 2, and further including a discharge drum attached to one end of said feed head, said strut being fixed to said feed head immediately adjacent said discharge drum.

4. An arrangement according to claim 1, wherein said feed head comprises a supporting structure made of rolled profiles and a wind brace connecting said rolled profiles for reinforcement.

5. An arrangement according to claim 1, wherein said drive comprises a drive belt and a plurality of discs for guiding and reversing said drive belt, with at least one of said discs being actuatable by a motor.

6. An arrangement according to claim 5, wherein said drive belt comprises a drive chain and said discs comprise chain wheels for engaging said drive chain.

7. An arrangement according to claim 1, wherein said drive comprises two parallel drives arranged on a common shaft.

8. An arrangement according to claim 1, wherein said box girder has a width that increases toward an end of said platform adjacent said portal, with said box girder having a lesser width in its forward region.

9. An arrangement according to claim 1, further comprising walkways arranged at least on each side of and parallel to said feed head and in the region of said platform; and a windbreak disposed on exterior sides of said walkways.

10. An arrangement according to claim 1, wherein said pylon has a free end and further comprising a pulley mechanism attached to the free end of said pylon for fixing and reversing guy cables.

* * * * *